United States Patent [19]
Blacha et al.

[11] Patent Number: 5,247,597
[45] Date of Patent: Sep. 21, 1993

[54] OPTICAL FIBER ALIGNMENT

[75] Inventors: Armin Blacha, Horgen; Fritz Gfeller, Rueschlikon; Peter Vettiger, Langnau am Albis, all of Switzerland

[73] Assignee: International Business Machines Corporation, Armonk, N.Y.

[21] Appl. No.: 898,866

[22] Filed: Jun. 15, 1992

[30] Foreign Application Priority Data

Mar. 25, 1992 [EP] European Pat. Off. ........ 92810219.3

[51] Int. Cl.$^5$ .............................................. G02B 6/42
[52] U.S. Cl. ...................................... 385/88; 385/39; 385/90; 385/49
[58] Field of Search ...................... 385/88, 89, 90, 91, 385/92, 93, 94, 14, 130, 39, 33, 49

[56] References Cited

U.S. PATENT DOCUMENTS

| | | | |
|---|---|---|---|
| 4,756,590 | 7/1988 | Forrest | 350/96.15 |
| 4,812,002 | 3/1989 | Kato | 350/96.18 |
| 4,826,272 | 5/1989 | Pimpinella et al. | 385/92 |
| 4,890,895 | 1/1990 | Zavracky et al. | 14/130 |
| 4,892,377 | 1/1990 | Randle | 385/39 |
| 4,989,934 | 2/1991 | Zavracky et al. | 385/14 |

FOREIGN PATENT DOCUMENTS 0463390 5/1991 European Pat. Off. .
61-02091 1/1986 Japan .

OTHER PUBLICATIONS

"Permanent Attachment of Single-Mode Fiber Arrays to Waveguides", E. J. Murphy, et al., Journal of Lightwave Technology, vol. Lt-3, No. 4, Aug. 1985, pp. 795-798.

"Self-Adjusted Permanent Attachment of Fibers to GaAs Waveguide Components", H. Kaufmann, et al., Electronics Letters, vol. 22, No. 12, Jun. 1986, pp. 642-644.

"Passive Coupling of InGaAsP/InP Laser Array and Singlemode Fibers Using Silicon Waferboard", C. A. Armiento, et al., Electronics Letters, vol. 27, No. 12, Jun. 1991, pp. 1109-1111.

"Silicon Photodetector Structure for Direct Coupling of Optical Fibers to Integrated Circuits", R. W. Ade, et al., IEEE Transactions on Electron Devices, vol. ED-34, No. 6, Jun. 1987.

"Efficient Coupling of Optical Fiber to Silicon Photodiode", O. Baltuch, et al., IEEE Electron Device Letters, vol. 10, No. 6, Jun. 1989, pp. 255-256.

U.S. Pat. No. 4,890,895 (P. Zavracky, et al.) issued Jan. 2, 1990 discloses an optoelectronic interconnections for III-V devices on silicon.

*Primary Examiner*—John D. Lee
*Assistant Examiner*—Phan T. Heartney
*Attorney, Agent, or Firm*—Richard Lau

[57] ABSTRACT

Alignment of an optical fiber coupled to a surface emitting or surface receiving optical element situated on a substrate wherein the optical fiber is situated in a via hole on an alignment chip. The alignment is bonded to the substrate using at least one solder bond.

9 Claims, 8 Drawing Sheets

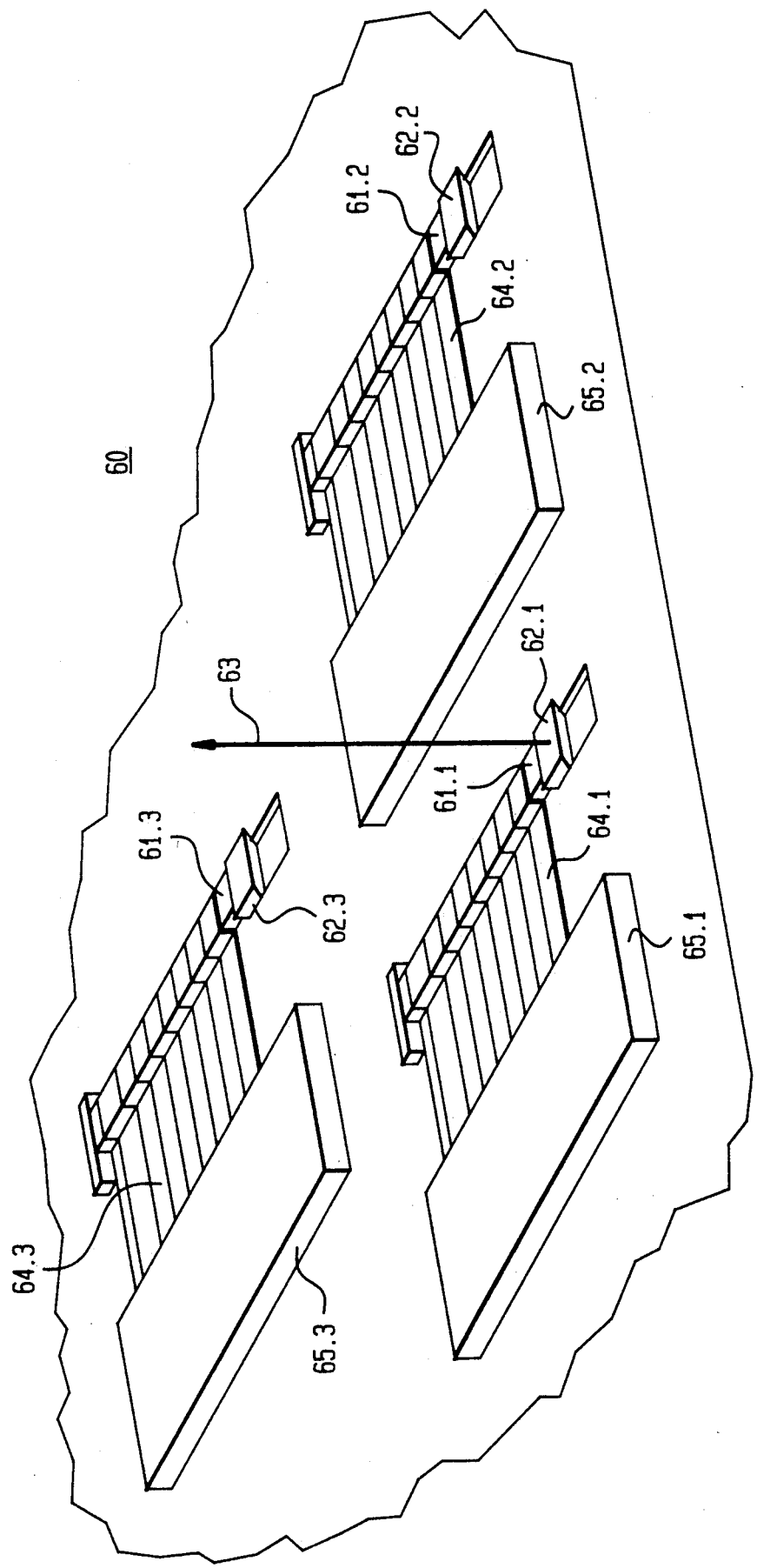

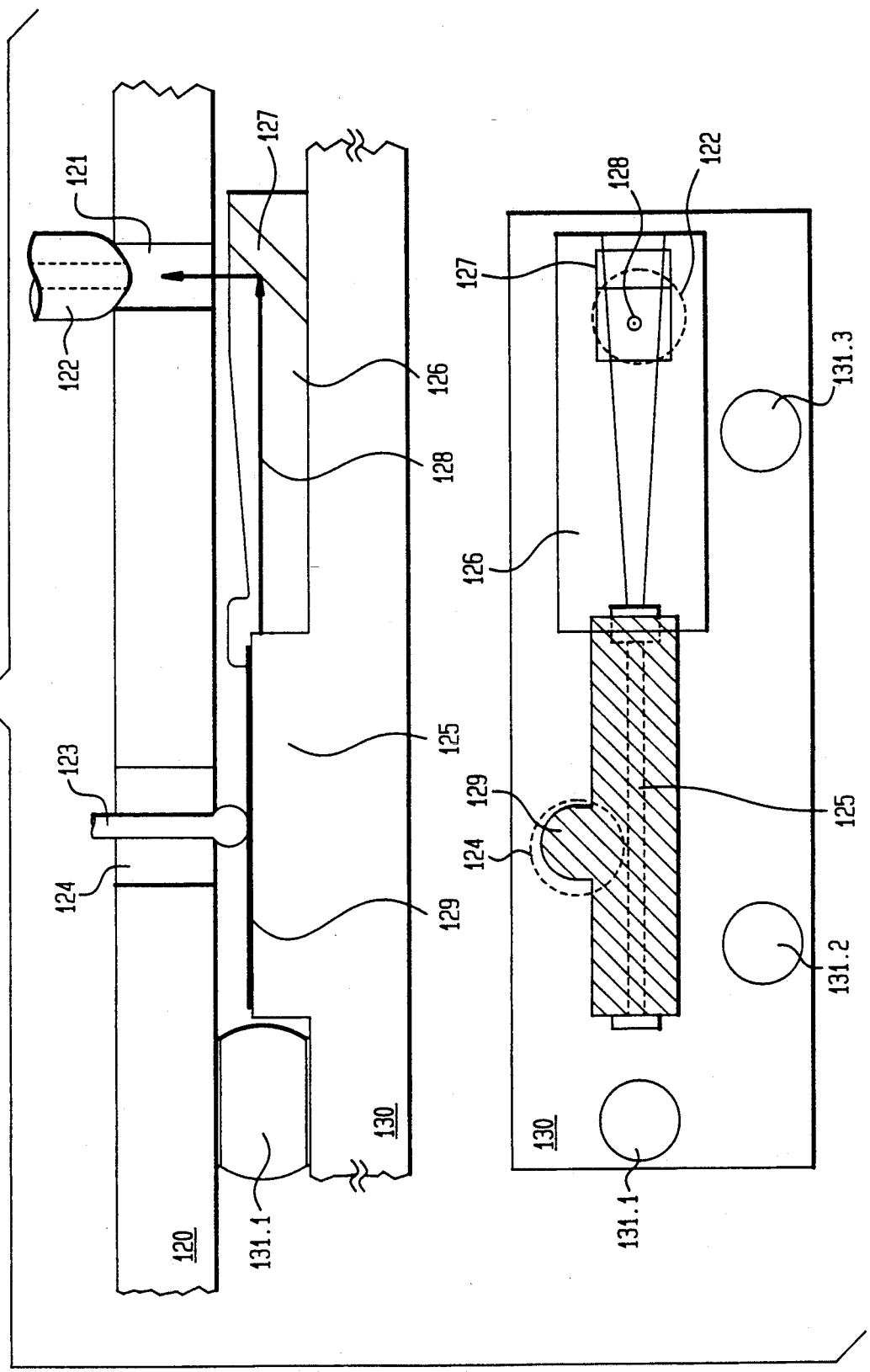

OPTICAL FIBER ALIGNMENT

TECHNICAL FIELD

The present invention concerns a self-alignment scheme for optical fibers. The optical fibers are aligned such that they are efficiently linked to surface emitting or surface receiving opto-electronic integrated circuits (OEICs). The present self-alignment scheme is suited for the alignment of a single fiber to one opto-electronic circuit as well as for the alignment of an array of fibers to an array of opto-electronic circuits. In addition the self-alignment scheme is compatible with IBM's Full-Wafer (FUWA) Technology.

BACKGROUND OF THE INVENTION

With the ongoing development of opto-electronic elements such as active opto-electronic devices (lasers, photodiodes), passive waveguide devices (beam splitters, lenses), and functional optical waveguide devices (optical switches, wavelength filters) there is an increasing demand for links between these optical devices. Single-mode as well as multi-mode fibers linking optical devices or systems serve as perfect transmission media for optical signals. Coupling opto-electronic circuits and fibers is a challenging area to which more and more attention is paid.

Typical approaches provide for optical links between opto-electronic devices, such as edge-emitting laser diodes, and fibers. These approaches are based on the idea to align the optical fibers in a groove etched into a substrate, preferably silicon (Si). By coupling this substrate to an edge-emitting device, or fixing an edge-emitting device on top of this substrate, the emitted light is coupled into the fiber. An overview, of different approaches known, is given by the following articles:

"Permanent Attachment of Single-Mode Fiber Arrays to Waveguides", E. J. Murphy et al., Journal of Lightwave Technology, Vol. Lt-3, No. 4, August 1985, pp. 795-798;

"Self-Adjusted Permanent Attachment of Fibers to GaAs Waveguide Components", H. Kaufmann et al., Electronics Letters, Vol. 22, No. 12, June 1986, pp. 642-644;

"Passive Coupling of InGaAsP/InP Laser Array and Singlemode Fibers Using Silicon Waferboard", C. A. Armiento et al., Electronics Letters, Vol. 27, No. 12, June 1991, pp. 1109-1111.

These approaches are not suited for the alignment of fibers to surface emitting or surface receiving opto-electronic devices. Specially in the field of high integrated opto-electronic circuits it becomes more and more important to provide for an optical link perpendicular to the substrates surface, which allows dense packaging of multiple devices with separate fiber links. Some approaches, described in the below cited references, are known in the art which provide for a perpendicular link of a fiber to an opto-electronic device.

The article "Silicon Photodetector Structure for Direct Coupling of Optical Fibers to Integrated Circuits" R. W. Ade et al., IEEE Transactions on Electron Devices, Vol. ED-34, No. 6, June 1987, pp. 1283-1288, concerns a silicon photodetector having an integrated fiber-optic coupler (IFOC). This fiber-optic coupler mainly consists of a hole being etched into the top layer of the photodetector, such that an optical single-mode fiber with tapered end can be inserted into this hole. The position of the end facet of the fiber is defined by the diameter of the tapered end and the diameter and depth of the hole. Light, being fed through the fiber, is coupled into the detector via a small air gap.

Another coupling scheme, providing for a link between a single-mode fiber with tapered end and a surface receiving p-n junction diode, is described in the article "Efficient Coupling of Optical Fiber to Silicon Photodiode", O. Baltuch et al., IEEE Electron Device Letters, Vol. 10, No. 6, June 1989, pp. 255-256. The diode is monolithically integrated on a silicon substrate, its top being covered with a contact metallization and a thick layer of spin-on glass (SOG). A hole is etched through the SOG layer and the metallization providing for a window to the diode. A single-mode fiber is aligned to the diode by inserting its tapered end into the hole.

A quasi-monolithic opto-electronic circuit is disclosed in U.S. Pat. No. 4,890,895 comprising an opto-electronic GaAs device 12 being formed on a silicon substrate 10, as illustrated in FIG. 1. This substrate 10 has a groove 14, perpendicular to its main surface 16, such that an optical fiber 15, which is inserted into the groove 14, is aligned perpendicular to the GaAs device 12. A ball lens 13 is situated between fiber end and the GaAs device 12 to improve the coupling efficiency. In addition, a silicon device 11 can be monolithically integrated on the silicon substrate 10. This U.S. patent forms the nearest prior art with respect to the present invention since it shows:

1. a surface receiving GaAs detector 12, and
2. a silicon substrate 10 with perpendicular groove 14, in particular pyramidal.

The U.S. patent explicitly relates to systems for opto-electronically interconnecting III–V or II–VI devices grown on silicon substrates. The fiber 15 is aligned to the respective device 12, integrated on the substrate 10, by etching a groove 14 in its back side 16 which extends up to the device 12 to be opto-electronically interconnected. This etch-step is in the above patent specification and hereinafter referred to as back-etching. Before back-etching the silicon substrate 10, a resist mask has to be formed, requiring photolithographic steps, including very precise alignment of the respective photolithographic masks, in addition to the photolithographic steps for the definition of the devices on top of the substrate. By etching the groove to expose the bottom of a device to be interconnected, typical etch damages occur, reducing the reliability and quality of the whole opto-electronic circuit.

SUMMARY OF THE INVENTION

The main object of this invention is to provide a self-aligning link between optical fibers and devices reflecting, emitting, or receiving light perpendicular to the main surface of the substrate.

Another object of this invention is to provide a self-aligning link between multiple optical fibers and multiple devices reflecting, emitting, or receiving light perpendicular to the main surface of the substrate.

A further object of the present invention is to provide a self-aligning link between an array of optical fibers and an array of devices reflecting, emitting, or receiving light perpendicular to the main surface of the substrate.

Another object is to provide a method for the alignment.

This has been accomplished by providing for an alignment chip having via holes of precisely defined size in which the fibers are pre-aligned. By solder bonding this alignment chip on a substrate with surface reflecting, emitting, or receiving elements, the fiber or fibers are automatically aligned to these elements. The fibers can be further fixed in a fiber ferrule prior to inserting them into the holes of the alignment chip.

BRIEF DESCRIPTION OF THE DRAWINGS

The invention is described in detail below with reference to the following drawings which are schematic and not drawn to scale, while more particularly the dimensions of some parts are exaggerated for the sake of clarity.

FIG. 6 is a schematic perspective view of an opto-electronic circuit in accordance with the first embodiment of the present invention.

FIG. 12 is a schematic cross-sectional and top view of an alignment structure in accordance with the fourth embodiment of the present invention.

DETAILED DESCRIPTION OF THE PREFERRED EMBODIMENT

Optical fibers are the preferred transmission media for telecommunications, remote powering, measurement equipments and medical applications. Besides long-distance transmission, which has been the primary application area, optical fibers are also used for many short-distance applications. Two groups of fibers, multi-mode (MM) fibers and single-mode (SM) fibers, are mainly employed in todays opto-electronic systems.

Figure 1:
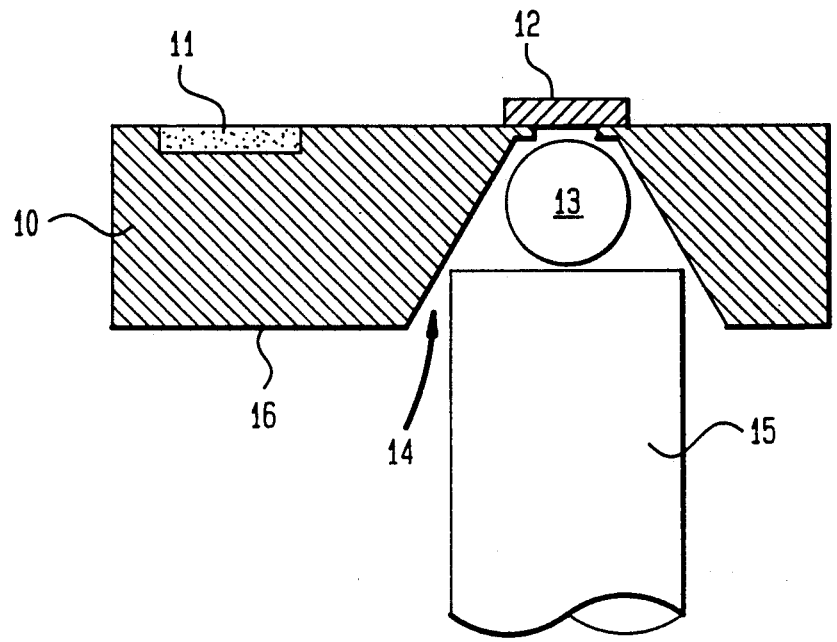
FIG. 1 is a schematic cross-sectional view of a fiber link, disclosed in U.S. Pat. No. 4,890,895 (Prior Art).
Figure 2:
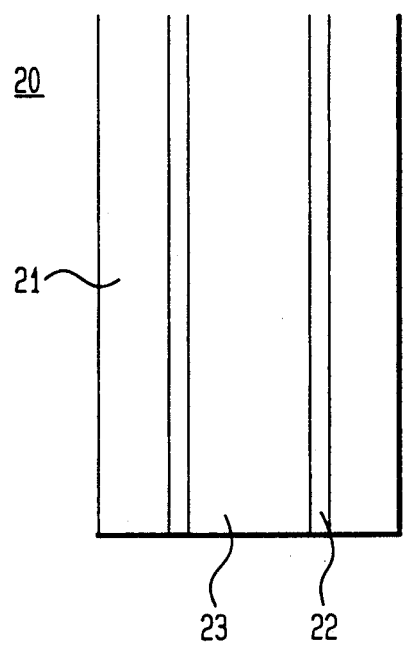
FIG. 2 is a schematic cross-sectional view of a multi-mode fiber.
Figure 3:
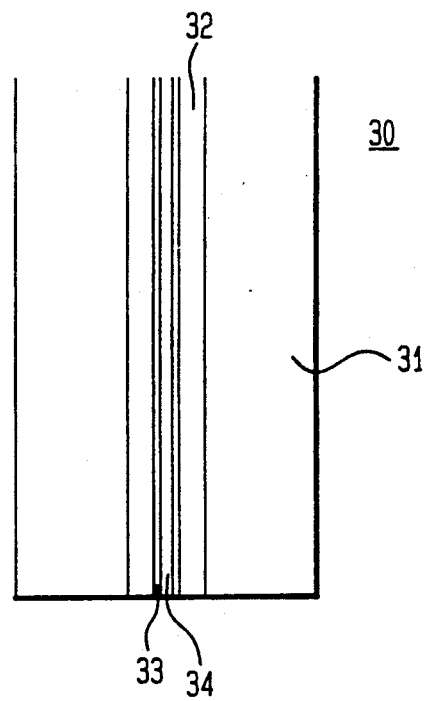
FIG. 3 is a schematic cross-sectional view of a single-mode fiber.

Typical multi-mode and single-mode fibers consist of a core which is encased in several protective cylindrical layers. The multi-mode fiber 20, shown in FIG. 2, and the single-mode fiber 30, shown in FIG. 3, consist of a glass core which is embedded in a multipurpose coating. This coating, typically made of ultraviolet curable acrylate or silicon, serves as a moisture shield and as mechanical protection during the initial stages of fiber production. A secondary buffer is typically extruded over this coating to further improve the strength of the single fiber element. This buffer can be either a tight tube construction, as shown in FIGS. 2 and 3, or a loose tube construction. Depending on the required index profiles, the core is further covered by one or more cladding layers, as shown in FIG. 3.

The multi-mode fiber 20, shown in FIG. 2, has a glass core 23 being encased by a coating layer 22, together being protected by an outer tube 21. Typical diameters of multi-mode fibers are: 125 $\mu$m outside diameter and 50±3 $\mu$m core diameter. The non-circularity of the core and the tolerance of the outside diameter are typically about ±3 $\mu$m. A multi-mode fiber has a higher loss and a significantly lower bandwidth compared to single-mode fibers such that they are mostly used for short-distance transmission such as in Local Area Networks (LAN), data-links, and other premises applications where emphasis is placed on low-cost splices and connections.

The single-mode fiber 30, shown in FIG. 3, is designed such that a light wave is confined in the core 34 which is embedded in a doped cladding layer 33. This cladding layer 33 provides for a refractive index profile being well suited for the transmission of a special wavelength. The cladding layer 33 is encased by a coating layer 32, the whole inner structure being covered by a tube 31. Dimensions of conventionally used single-mode fibers are: 125 $\mu$m outside diameter, with a tolerance of ±2 $\mu$m, and 8 $\mu$m core diameter. Single-mode fibers are characterized by low transmission and splice losses, suitable dispersion characteristics and low macro- and micro-bending losses. Details of MM and SM fibers are given in "The Photonics Design and Application Handbook", Book 3, 35th edition, 1989, pp. H104-H109, by the publishers of the Photonics Spectra Magazine, Laurin Publishing Co. Inc., PO BOX 1146 Department A0-89, Pittsfiel, Mass. 01202-9985, USA.

The present invention is based on the idea, that an optical fiber can be efficiently coupled to a light emitting or receiving element when pre-aligning it in an alignment chip with suitable via hole prior to flipping this alignment chip onto the substrate where the element is situated. The position of the alignment chip with fiber is, with respect to the substrate, precisely defined when employing the solder bond technique which automatically brings both parts, the alignment chip and the substrate, into a perfect position by the surface tension of the melted solder balls.

Figure 4A:
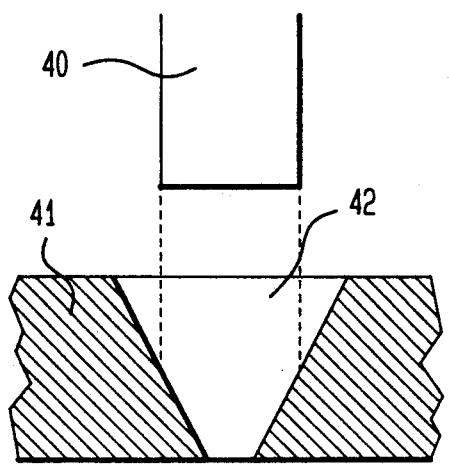
FIG. 4 is a schematic view of plane end fibers with suitable alignment chips having:
A: a conical via hole with circular cross-section;
B: a pyramidal via hole with quadratic cross-section.
Figure 4B:
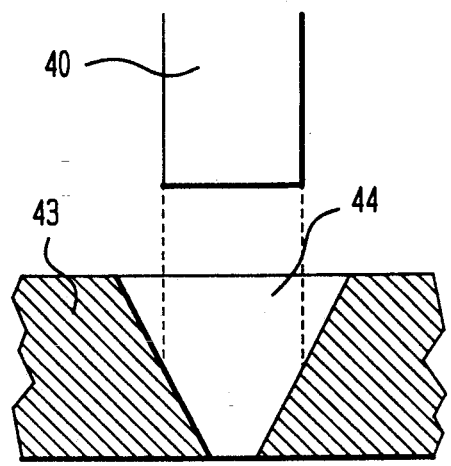

Some exemplary alignment chips, are illustrated in FIGS. 4 and 5. In FIGS. 4A-4B, a fiber 40 with plane end is shown. A plane end fiber 40 can be pre-aligned by inserting it into different via holes. Two different via holes 42 and 44 are shown in FIGS. 4A-4B. In FIG. 4A, a conical via hole 42 with circular cross-section is shown, which for example can be drilled into a substrate 41. By inserting the cylindrical fiber 40, which has a smaller outside diameter than the hole's top diameter, its position is reproducible defined by the sizes and shapes of hole and fiber. The more precise a via hole can be made, the better the position of the fiber to be inserted into this hole is defined. A pyramidal via hole 44 with quadratic cross-section, formed in substrate 43, can also serve as alignment means, as shown in FIG. 4B.

Figure 5A:
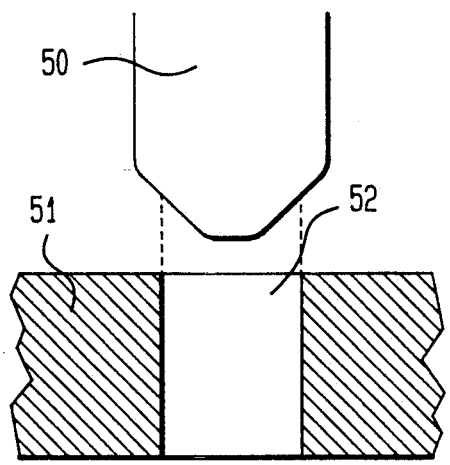
FIG. 5 is a schematic view of tapered-end fibers with suitable alignment chips having:
A: a cylindrical via hole;
B: a via hole with quadratic cross-section;
C: a conical via hole with circular cross-section;
D: a pyramidal via hole with quadratic cross-section.
Figure 5B:
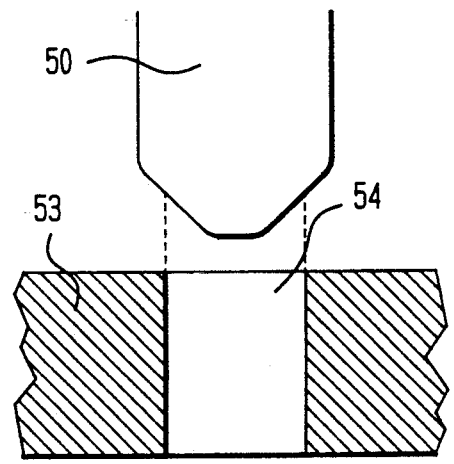
Figure 5C:
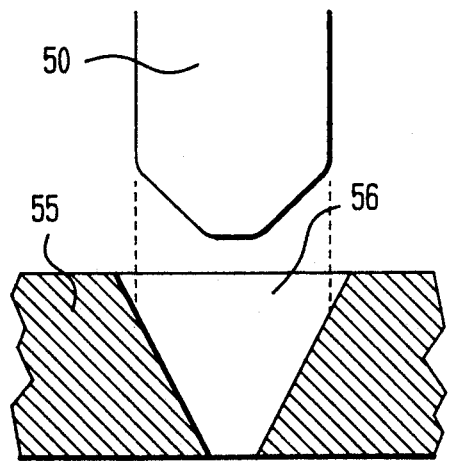
Figure 5D:
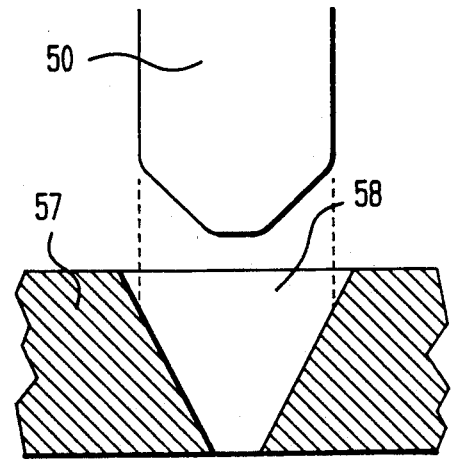

Different via holes, for the alignment of a fiber 50 with tapered end, are shown in FIG. 5A-5D. A cylindrical via hole 52 etched into a substrate 51 and a via hole 54 with quadratic cross-section etched into a substrate 53, are shown. In FIGS. 5C and 5D, a conical via hole 56 with circular cross-section, formed in a substrate 55, and a pyramidal via hole 58 with quadratic cross-section, formed in a substrate 57, are shown. Various other designs of via holes are conceivable, only some of them being demonstrated in FIGS. 4 and 5.

Fibers with a microlensed end or fibers with an external additional lens require via holes being specially adapted to provide for a precise pre-alignment. Various fibers with different microlenses are known in the art, some of them being listed below.

"Microlenses on the End of Single-Mode Optical Fibers for Laser Applications", K. S. Lee et al., Applied Optics, Vol. 24, No. 19, October 1985, pp. 3134-3139;

"Efficient Coupling of Laser Diodes to Tapered Monomode Fibers with High-Index End", G. D. Khoe et al., Electronics Letters, Vol. 19, No. 6, March 1983, pp. 205-207;

"Efficient Coupling form Semiconductor Lasers into Single-Mode Fibers with Tapered Hemispherical Ends", H. Kuwahara et al., Applied Optics, Vol. 19, No. 15, August 1980, pp. 2578-2583;

"Shape Analysis and Coupling Loss of Microlenses on Single-Mode Fiber Tips", B. Hillerich, Applied Optics, Vol. 27, No. 15, August 1988, pp. 3102-3106;

"Comparison of Efficient and Feedback Characteristics of Techniques for Coupling Semiconductor Lasers to Single-Mode Fiber", G. Wenke et al., Applied Optics, Vol. 22, No. 23, December 1983, pp. 3837-3844;

"Self-Aligned Flat-Pack Fiber-Photodiode Coupling", B. Hillerich et al., Electronics Letters, Vol. 24, No. 15, July 1988, pp. 918-119.

Different opto-electronic elements are known in the art which reflect or emit light perpendicular to the main surface of the substrate on which they are formed or situated. Other opto-electronic elements are known receiving light perpendicular to the surface of the substrate. All these elements will be hereinafter referred to as surface emitting and surface receiving elements.

Different surface emitting laser diodes are described in the following references:

"Room Temperature Continuous Wave Lasing Characteristics of GaAs Vertical Cavity Surface-Emitting Laser", F. Koyama et al., Applied Physics Letters, Vol. 55, No. 3, July 1989, pp. 221-222;

"Room-Temperature Continuous-Wave Vertical-Cavity Single-Quantum-Well Microlaser Diodes", Y. H. Lee et al., Electronics Letters, Vol. 25, No. 20, September 1989, pp. 1377-1378 with a detailed follow-up article of some co-authors of Y. H. Lee, "Microlasers", J. L. Jewell et al., Scientific American, November 1991, pp. 56-62;

"Use of Implant Isolation for Fabrication of Vertical Cavity Surface-Emitting Laser Diodes", K. Tai et al., Electronics Letters, Vol. 25, No. 24, November 1989, pp. 1644-1645;

"Room Temperature Continuous-Wave Vertical-Cavity Surface-Emitting GaAs injection Laser", K. Tai et al., Applied Physics Letters, Vol. 55, No. 24, December 1989, pp. 2473-2475;

"InGaAsP(1,3 µm)/InP Vertical-Cavity Surface-Emitting Laser Grown by Metalorganic Vapor Phase Epitaxy", L. Yang et al., Applied Physics Letters, Vol. 56, No. 10, March 1990, pp. 889-890;

"Vertical-Cavity Surface-Emitting InGaAs/GaAs Lasers with Planar Lateral Definition", M. Orenstein et al., Applied Physics Letters, Vol. 56, No. 24, June 1990, pp. 2384-2386;

"90% Coupling of Top Surface Emitting GaAs/AlGaAs Quantum Well Laser Output into 8 µm Diameter Core Silica Fiber". K. Tai et al., Electronics Letters, Vol. 26, No. 19, September 1990, pp. 1628-1629.

Typical light emitting diodes and photo detectors can be employed as light sources on one hand and as light detectors on the other hand. A surface receiving photodetector is described in the already cited article "Silicon Photodetector Structure for Direct Coupling of Optical Fibers to Integrated Circuits" R. W. Ade et al., IEEE Transactions on Electron Devices, Vol. ED-34, No. 6, June 1987, pp. 1283-1288. A surface receiving p-n junction photo diode is reported on in the article "Efficient Coupling of Optical Fiber to Silicon Photodiode", O. Baltuch et al., IEEE Electron Device Letters, Vol. 10, No. 6, June 1989, pp. 255-256.

In addition to these active opto-electronic elements, focusing grating couplers, beam splitters, prisms, and mirrors can be employed to perpendicularly reflect light out of a circuit or to couple light, which arrives perpendicular, into the circuit. Some of these optical elements are described in the book "Optical Integrated Circuits", H. Nishihara et al., McGraw-Hill Electro-Optical Engineering Series, McGraw-Hill Book Company, 1987, and in the following articles:

"Vertically Emitting Laser with Integrated Non-Absorbing Mirror Deflector", IBM Technical Disclosure Bulletin, August 1989, Vol. 32, No. 3B, pp. 498-499;

"Beveled Waveguides for Flip Chip Opto-Electronic Receivers", IBM Technical Disclosure Bulletin, December 1990, Vol. 33, No. 7, pp. 194-196;

"Three-Dimensional Optical Waveguide Splitter", IBM Technical Disclosure Bulletin, Vol. 34, No. 5, October 1991, pp. 46-48.

Figure 7:
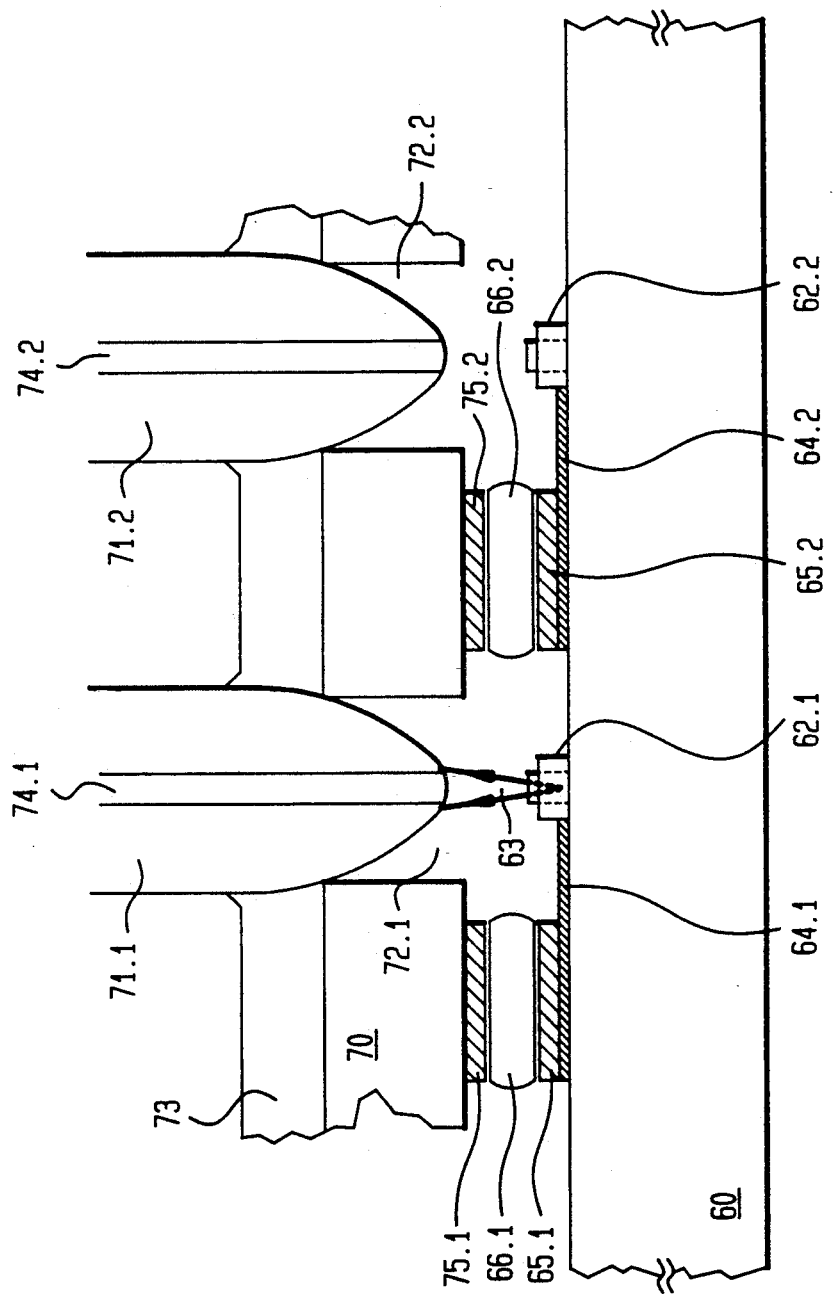
FIG. 7 is a schematic cross-sectional view of an alignment structure in accordance with the first embodiment of the present invention.

A first embodiment of the present invention is described in context with FIGS. 6 and 7. This embodiment requires fibers to be nearly parallel before inserting them into the respective via holes of the alignment chip. In addition, it is not known in the art whether the angle of the tapered fiber end is precisely reproducible such that the position of the fiber, being inserted into the via hole, is well defined. An opto-electronic circuit on which multiple edge-emitting laser diodes 61.1-61.3 are integrated is shown in FIG. 6. These lasers 61.n are coupled to end facet mirrors 62.1-62.3 such that light, emitted by a laser, is perpendicularly reflected out of the circuit 60, as indicated by the beam 63. The laser diodes 61.1-61.3 are covered by thin contact metallizations 64.1-64.3 which provide for an electric interconnection to solder wettable metal pads 65.1-65.3. Solder balls of precisely defined volume are placed on these pads 65.1-65.3 prior to flipping an alignment chip 70, with corresponding solder wettable pads 75.1 and 75.2, onto the circuit 60.

A cross-section of the assembly, which consists of the alignment chip 70 being flipped onto and bonded to the opto-electronic circuit 60, is illustrated in FIG. 7. As can be seen from this Figure, two fibers 71.1 and 71.2 with fiber cores 74.1, 74.2 are fixed in cylindrical via holes 72.1, 72.2 etched into the alignment chip 70, using a solder, epoxy or spin on glass (SOG) 73. The alignment chip 70 with fibers 71.1-71.2 is automatically aligned to the surface emitting laser/mirror arrangement by heating the hole structure such that the solder balls 66.1-66.2 melt. The surface tension of the melted solder balls 66.1-66.2 acts to minimize the total energy of the assembly by moving the alignment chip 70 with respect to the circuit 60. On cooling, precise alignment of the assembly is achieved, the accuracy being determined by the photolithographic definition of the wettable pads 65.1-65.2, 75.1-75.2 and the volume control of the solder balls 66.1-66.2 as described in the below mentioned article of M. J. Wale et al. Details of this solder bond technique are reported on in the articles:

"Self-Aligned Controlled Collapse Chip Connect (SAC4)", L. Pfeiffer et al., Journal of the Electrochemical Society: Solid-State Science and Technology, Vol. 134, No. 11, November 1987, pp. 2940-2941;

"High-Reliability Flip-Chip GaInAs/InP pin Photodiode", O. Wada et al., Electronics Letters, Vol. 26, No. 18, August 1990, pp. 1484-1486;

"Self-Aligned Flip-Chip Assembly of Photonic Devices with Electrical and Optical Connections", M. J. Wale et al., IEEE Transactions on Components, Hybrids, and Manufacturing Technology, Vol. 13, No. 4, December 1990, pp. 780-786;

"Flip-Chip Solder Bond Mounting of Laser Diodes", C. Egde et al., Electronics Letters, Vol. 27, No. 6, March 1991, pp. 499-501.

The coupling efficiency between the light emitting elements and the fibers is mainly determined by several limiting conditions such as:
accuracy of the fiber's outside diameter,
fiber core to cladding offset,
accuracy of the focus point of the fiber,
accuracy of diameter of the via hole,
accuracy of the alignment chip's thickness,
accuracy of the solder's thickness,
accuracy of the wettable pad's thickness,
accuracy of the position of these pads,
accuracy of the laser's position,
accuracy of the mirror.

These conditions strongly depend on the materials used and the processes employed for the fabrication of the respective elements. Coupling efficiencies of 1-2 dB less than maximum can been achieved with the above described embodiment, some of the limiting parameters being reported on in the article "Self-Aligned Flip-Chip Assembly of Photonic Devices with Electrical and Optical Connections", M. J. Wale et al., IEEE Transactions on Components, Hybrids, and Manufacturing Technology, Vol. 13, No. 4, December 1990, pp. 780-786.

Figure 8:
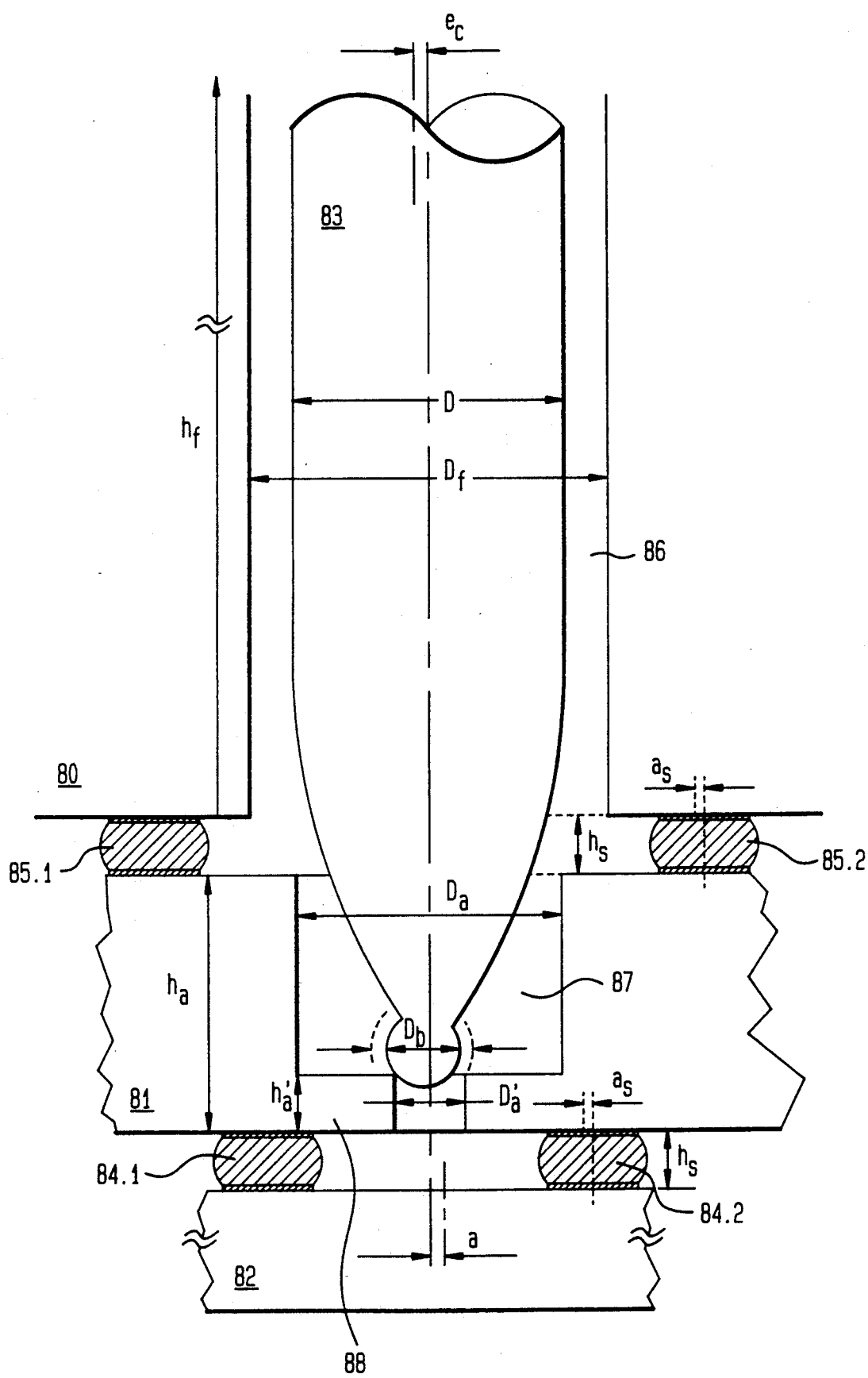
FIG. 8 is a schematic cross-sectional view of an alignment structure in accordance with the second embodiment of the present invention.

A more detailed estimate of the efficiency of an inventive opto-electronic link and the manufacturing tolerances is given in context with a second embodiment of the present invention. A cross-sectional view of this embodiment is shown in FIG. 8. A single-mode fiber 83 with a ball microlens is situated in a via hole 86 of a fiber ferrule 80 where it is pre-aligned. This fiber ferrule 80 is solder bonded to a silicon alignment chip 81 such that the fiber's tip is inserted into a via hole 87. This assembly is flipped onto a substrate 82 with at least one opto-electronic surface emitting device (not shown). As yet described in context with the first embodiment, the alignment chip 81 is precisely bonded to the substrate 82, using the solder bond technique. In the below given Table 2, the dimensions of the second embodiment are listed, giving details about the respective tolerances and accuracies.

TABLE 2

Dimensions of the second embodiment

| Part | No. | Dimensions | Material |
|---|---|---|---|
| fiber ferrule | 80 | h,5 - 10 mm | ceramic, metal, Si |
| via hole of ferrule | 86 | $D_f = 160 \ \mu m \pm 15 \ \mu m$ | — |
| fiber | 83 | $D = 125 \ \mu m \pm 2 \ \mu m$ | glass |
| ball microlens | — | $D_b = 40 \ \mu m \pm 8 \ \mu m$ | $SiO_2$ |
| solder balls | 85, 84 | $h_s = 10 \ \mu m \pm 0.8 \ \mu m$ | PbSn |
| wettable pads | — | $a_s = 0 \pm 0.5 \ \mu m$ | metal |
| alignment chip | 81 | $h_a = 120 \ \mu m \pm 10 \ \mu m$ | Si |
| via hole | 87 | $D_a = 72 \ \mu m \pm 5 \ \mu m$ | — |
| etched well | 88 | $D'_a = 27 \ \mu m \pm 2 \ \mu m$ $h'_a = 16 \pm 2 \ \mu m$ | — |
| laser axis (position relative to fiber axis; losses <1 dB | | x-direction $a_1 = 0 \pm 1,5 \ \mu m$ y-direction $a_1 = 0 \pm ,65 \ \mu m$ | — |

As can be seen from this table, and as described in the article "Efficient Coupling from Semiconductor Lasers into Single-Mode Fibers with Tapered Hemispherical Ends", H. Kuwahara et al., Applied Optics, Vol. 19. No. 15, August 1980, pp. 2578-2583, the position of the laser axis has to be within 3 $\mu$m in the direction parallel to the lasers junction and 1,3 $\mu$m in the direction perpendicular to this junction, to ensure coupling losses less than 1 dB below maximum coupling efficiency. The separation between fiber and laser has to be within ±8,5 $\mu$m from optimum position (~20 $\mu$m), allowing for coupling losses of less than 1 dB. This maximum displacements are achievable with ball bonding alignment, the lithographic accuracy (position of the solder wettable pads with respect to laser axis and via hole of the alignment chip) being assumed to be <1 $\mu$m.

The optimum distance of the laser aperture and the microlens has to be about 20 $\mu$m±8,5 $\mu$m for less than 1 dB coupling loss as shown in FIG. 4 of the above cited article of H. Kuwahara et al. This distance is mainly determined by the thickness of the reflowed solder balls 84.n, which have a maximum tolerance of 0,8 $\mu$m as reported on in the article "Self-Aligned Flip-Chip Assembly of Photonic Devices with Electrical and Optical Connections", M. J. Wale et al., IEEE Transactions on Components, Hybrids, and Manufacturing Technology, Vol. 13, No. 4, December 1990, pp. 780-786. In addition, the thickness of the etched well 88, approximately 16±2 $\mu$m, the diameter $D_b$ of the microlens, between 32 and 50 $\mu$m, and the diameter $D'_a$ of the etched well 88, approximately 27±2 $\mu$m, determine the overall distance. The resulting laser/fiber separation is estimated to be 20±8 $\mu$m. The parameters given in context with the second embodiment have been optimized. Further calculations are required when modifying this embodiment.

The tolerances between fiber ferrule 80 and alignment chip 81 are not critical and serve to insure that the fiber 83 is inserted into the etched via hole 86 of the alignment chip 81 without jamming. The alignment tolerance is approximately ±15 $\mu$m which can be achieved with the solder ball technique, for example, as illustrated in FIG. 8. The angular alignment of ±3 degrees, as cited in the article of H. Kuwahara et al., is achievable without problems. The fiber ferrule of the present embodiment allows an angular alignment better than ±1°, the thickness $h_f$ of the ferrule being 1 mm and the shift of the fiber axis relative to the via hole axis being within ±15 $\mu$m.

The second embodiment can be modified by the employment of fibers with other microlenses or without lenses. The structure of the alignment chip and the fiber ferrule can be modified as well.

Figure 9:
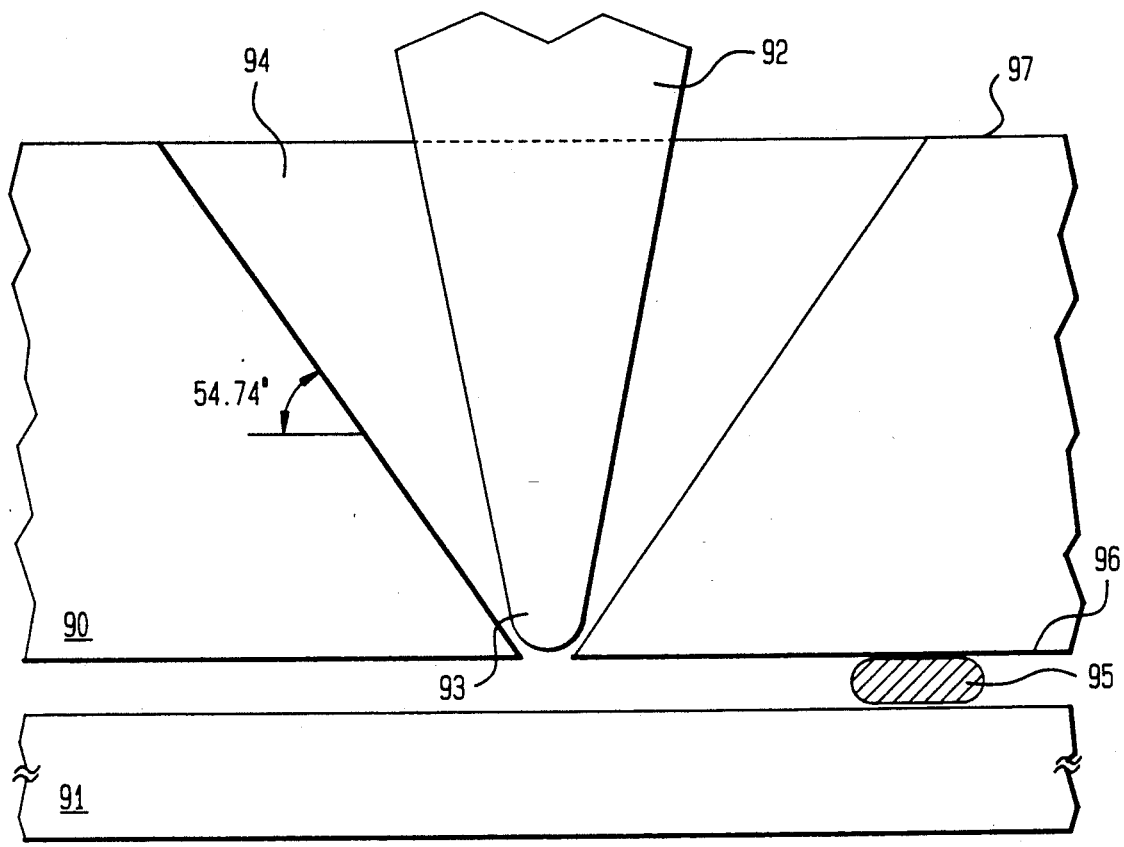
FIG. 9 is a schematic cross-sectional view of an alignment structure in accordance with the third embodiment of the present invention.
Figure 10:
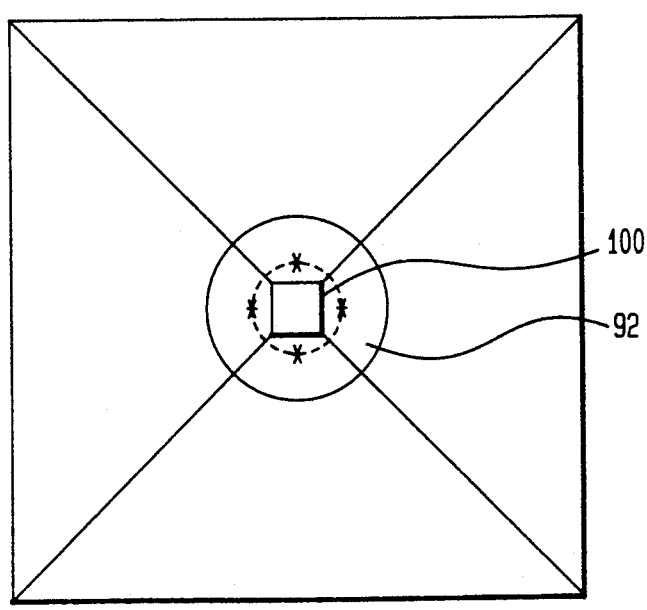
FIG. 10 is a schematic top view of the via hole of the alignment structure illustrated in FIG. 9.

A third embodiment, which is hereinafter described, is schematically illustrated in FIGS. 9 and 10. This assembly comprises a Si alignment chip 90 carrying a single-mode fiber 92 which has a hemispherical microlens 93. This alignment chip 90 is connected to an opto-electronic chip 91 on which a surface receiving element (not shown) is situated. A top view of the via hole 94 is shown in FIG. 10. As can be seen from these Figures, the alignment chip 90 has a pyramidal via hole 94 which only requires one etch step. This pyramidal cone, of quadratic cross-section, is described in the article "Self-Aligned Controlled Collapse Chip Connect (SAC4)", L. Pfeiffer et al., Journal of Electrochemical Society: Solid-State Science and Technology, Vol. 134, No. 11, November 1987, pp. 2940–2941. The pyramidal hole 94, which has 54,77 degree sidewalls corresponding to an (111) Si-plane, serves to guide the fiber 92 down to the square hole 100 at the bottom 96 responsible for lateral fiber alignment. The distance fiber/opto-electronic element is mainly determined by the thickness of the reflowed solder ball 95. The lithographically defined etching mask, to be formed on surface 97 of the alignment chip 90 prior to etching the via hole 94, corresponds to the chosen thickness of the Si alignment chip 90 to produce a square hole 100 of approximately 24×24 μm. The lithography of the solder wettable pad is aligned with respect to the square hole 100 at the bottom 96. The lateral tolerance of this pad has to be 0±1 μm.

Figure 11:
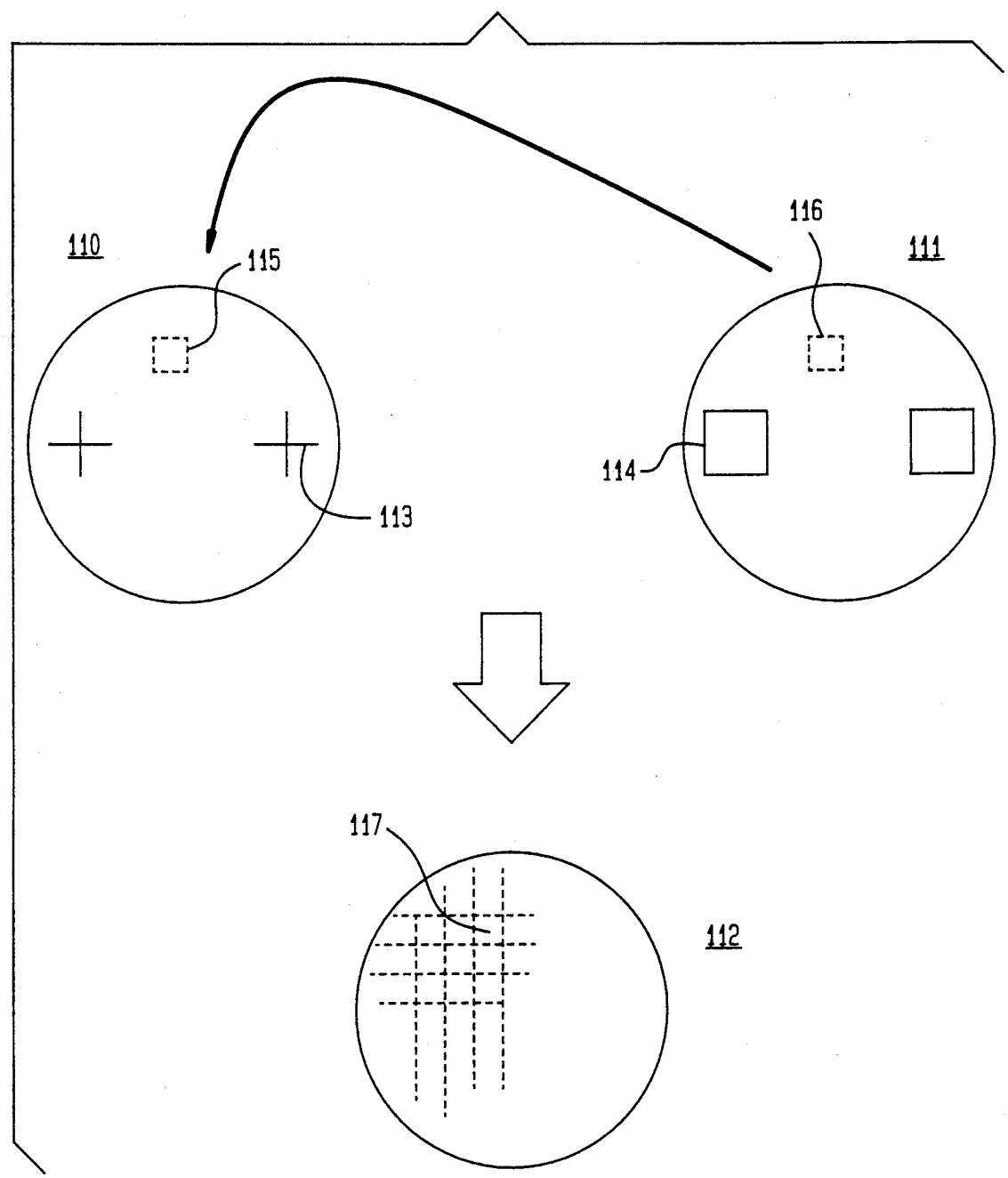
FIG. 11 shows the basic concept of the fourth embodiment of the present invention.

The fourth embodiment is a full-wafer implementation of the invention with multiple opto-electronic elements, situated on an opto-electronic wafer 110 being aligned to fibers by bonding an alignment chip 111 comprising these fibers onto said wafer 110 prior to the separation of the elements by cleaving, sewing or laser-ablating the hole assembly 112. This basic concept is illustrated in FIG. 11. The wafer 110 with opto-electronic elements, i.e. a GaAs laser wafer made by the Full-Wafer (FUWA) technology, has wafer-alignment marks 113 such that a Si alignment wafer 111, which has alignment windows 114 etched into it, can be flipped onto the wafer 110. The Full-Wafer technology is reported on in the article "Full Wafer Technology-A New Approach to Large-Scale Laser Fabrication and Integration", P. Vettiger et al., IEEE Journal of Quantum Electronics, Vol. 27, 1991. An advantage of this Full-Wafer approach is the reduction of numerous, expensive alignment steps by providing for the alignment of multiple fibers with one shot.

The alignment marks and corresponding alignment windows are designed such that both wafers 110 and 111 can be pre-aligned. The wafers 110, 111 are bonded together using the solder bond technique, as described in context with embodiments 1–3. These wafers, being bonded together, are then divided into smaller sections 115, referred to as laser cells. These cells 115 can be separated from the neighboring cells by laser ablation, etching, or cleaving. The alignment wafer 111 contains etched via holes with suitable cross-section. Fibers are inserted into these via holes after the separation of the laser cells 115, their position with respect to the light emitting or receiving elements on the complementary laser cell 116 being determined by the dimensions and the corresponding tolerances as yet described.

The laser cell 115 forms with the complementary cell 116 a cell-assembly 117.

Details of one cell of the hole two-wafer-sandwich 112 is illustrated in FIG. 12. As can be seen from this Figure, the complementary alignment cell 120, which is a cell of the alignment wafer 111, has a via hole 121 for the pre-alignment of an optical fiber 122 with tapered end, and a cylindrical via hole 124 serving as contact window for a bonding wire 123. The end of the fiber 122 is efficiently coupled to a laser diode 125, formed on the substrate 130, via a waveguide structure 126 and a 45 degree mirror 127. The light beam 128, emitted by the laser 125 and coupled into the fiber 122 is shown as arrow. The metallization 129 of laser 125, which partly covers the laser 125 and which has a contact pad is contacted by the bond wire 123. Both cells 120 and 130 of the assembly 112 are fixed together using melted solder bonds 131.1–131.3, their relative position being defined by the dimensions and tolerances of the assembly as described in context with the other embodiments. The solder bonds can in addition be employed as heat transfer bridges to ensure efficient cooling of the active elements situated on the substrate or can serve as electrical bridges between both parts of an assembly. While the invention has been described in terms of specific embodiments, it is evident in view of the foregoing description that numerous alternatives, modifications and variations will be apparent to those skilled in the art. Thus, the invention is intended to encompass all such alternatives, modifications and variations which fall within the scope and spirit of the invention and the appended claims.

What is claimed is:

1. An alignment apparatus of an optical fiber, comprising:
    a substrate;
    an optical element formed on said substrate, said optical element being adapted for having an optical fiber coupled thereto; and
    an alignment chip bonded on said substrate using at least one solder bond, said alignment chip comprising silicon and having a via hole pyramidal therethrough, said via hole being adapted for having a cylindrical optical fiber situated therein, and said via hole is etched, having four side walls with an angle of 54, 74 degrees and having a circular cross-section, the diameter of which converges such that the position of a cylindrical optical fiber is defined by inserting the cylindrical optical fiber from a side of the via hole which has a larger diameter than the other side of the via hole, and pushing the optical fiber as far as possible into the via hole.

2. An alignment apparatus for alignment of an optical fiber, comprising:
    a substrate;
    an optical element formed on said substrate, said optical element being adapted for having an optical fiber coupled thereto; and
    an alignment chip bonded on said substrate using at least one solder bond, said alignment chip comprising silicon and having a pyramidal via hole therethrough said via hole being adapted for having a cylindrical optical fiber situated therein, and said via hole is etched, having four side walls with an angle of 54, 74 degrees and having a circular cross-section such that the position of a cylindrical optical fiber with a tapered end is defined by inserting the cylindrical optical fiber as far as possible into the via hole.

3. An alignment apparatus according to claim 1 or 2, wherein said alignment chip further comprises at least one via hole serving as a contact window for a bonding wire.

4. An alignment apparatus for alignment of an optical fiber, comprising:
    a substrate;
    an optical element formed on said substrate, said optical element being adapted for having an optical fiber coupled thereto; and
    an alignment chip bonded on said substrate using at least one solder bond, said alignment chip comprising at least one cylindrical via hole with constant diameter, said via hole being adapted for having a cylindrical optical fiber with a tapered end situated therein such that a light beam emitted by an edge emitting laser diode, situated on said substrate, is coupled via a mirror into the core of the optical fiber, wherein the position of the optical fiber is defined by inserting the optical fiber as far as possible into the via hole.

5. An alignment apparatus for alignment of an optical fiber, comprising:
    a substrate;
    an optical element formed on said substrate, said optical element being adapted for having an optical fiber coupled thereto; and
    an alignment chip bonded on said substrate using at least one solder bond, said alignment chip having a via hole with a cylindrical upper part with constant diameter and a lower part with constant diameter, wherein the diameter of the upper part is greater than the diameter of the lower part, said via hole being adapted for having an optical fiber with a tapered end positioned therein by inserting the optical fiber as far as possible into the via hole, said optical fiber being pre-aligned in a fiber ferrule bonded to said alignment chip by at least one solder bond.

6. A method for aligning an optical fiber coupled to a surface emitting element formed on a substrate comprising the steps of:
    pre-aligning an optical fiber by inserting the optical fiber into a via hole of an alignment chip;
    affixing the optical fiber in said via hole;
    flipping said alignment chip onto said substrate;
    coarsely aligning said alignment chip on said substrate such that a solder wettable pad on said substrate is placed opposite of the corresponding solder wettable pad on said alignment chip, and such that a solder ball placed therebetween provides for a contact between the corresponding pads;
    melting said solder ball; and
    cooling the melted solder ball down such that said alignment chip and said substrate are precisely aligned by surface tension of the melted solder ball.

7. A method for aligning an optical fiber according to claim 6, wherein the optical fiber is coupled to a surface receiving element.

8. A method for aligning multiple optical fibers to an opto-electronic wafer comprising cells, each cell comprising surface emitting and/or surface receiving elements comprising the steps of:
    flipping an alignment wafer having via holes onto an opto-electronic wafer;
    providing for coarse alignment of both wafers using alignment marks thereon, such that each via hole is pre-aligned to the respective surface emitting or surface receiving element, and such that solder wettable pads on said opto-electronic wafer are placed opposite of the corresponding solder wettable pads on said alignment wafer and such that a solder ball placed therebetween provides for a contact between the corresponding pads;
    melting said solder ball;
    cooling the melted solder ball such that the alignment wafer and the opto-electronic wafer are aligned by the surface tension of the melted solder ball;
    separating the cells of the wafer assembly;
    pre-aligning the optical fibers by inserting each optical fiber into one of said via holes of said alignment wafer; and
    affixing the optical fibers in said via holes.

9. A method for aligning optical fibers according to claims 6, 7, or 8, further comprising the step of inserting each optical fiber into a via hole of a fiber ferrule prior to inserting the optical fiber into said via hole of the alignment chip to prevent jamming of the optical fiber.

* * * * *